United States Patent [19]

Lau et al.

[11] Patent Number: 4,911,238

[45] Date of Patent: Mar. 27, 1990

[54] GAS FLOODING WITH SURFACTANTS ENRICHED IN OLEFIN DISULFONATE

[75] Inventors: Hon Chung Lau; John K. Borchardt, both of Houston, Tex.

[73] Assignee: Shell Oil Company, Houston, Tex.

[21] Appl. No.: 286,397

[22] Filed: Dec. 19, 1988

[51] Int. Cl.⁴ ............................................. F21B 43/22
[52] U.S. Cl. .................................... 166/273; 166/268; 166/275; 166/305.1; 166/309; 252/8.554
[58] Field of Search ............... 166/268, 269, 273, 275, 166/305.1, 309; 252/8.554

[56] References Cited

U.S. PATENT DOCUMENTS

| | | |
|---|---|---|
| 2,866,507 | 12/1958 | Bond et al. |
| 3,185,634 | 5/1965 | Craig et al. |
| 3,376,924 | 4/1968 | Felsenthal et al. |
| 3,415,753 | 12/1968 | Stein et al. ........................... 252/121 |
| 3,491,832 | 1/1970 | Raza .................................. 166/309 X |
| 3,529,668 | 9/1970 | Bernard ................................. 166/273 |
| 3,686,098 | 8/1972 | Weil .................................... 252/550 |
| 3,721,707 | 3/1973 | Straus et al. ........................ 260/513 |
| 3,893,511 | 7/1975 | Root .................................. 166/309 X |
| 4,115,437 | 9/1978 | Matsuda et al. |
| 4,393,937 | 7/1983 | Dilgren et al. ....................... 166/272 |
| 4,507,223 | 3/1985 | Tano et al. ........................ 252/8.554 |
| 4,532,993 | 8/1985 | Dilgren et al. ................. 166/309 X |
| 4,537,253 | 8/1985 | Morita et al. ....................... 166/274 |
| 4,544,033 | 10/1985 | Ukigai et al. ........................ 166/274 |
| 4,556,107 | 12/1985 | Duerksen et al. ................... 166/272 |
| 4,556,108 | 12/1985 | Morita et al. ........................ 166/274 |
| 4,572,294 | 2/1986 | Duerksen et al. ................... 166/273 |
| 4,576,232 | 3/1986 | Duerksen et al. ................... 166/274 |
| 4,607,700 | 8/1986 | Duerksen et al. ............. 166/309 X |
| 4,662,445 | 5/1987 | Gupta .................................. 166/274 |
| 4,693,311 | 9/1987 | Muijs et al. ........................ 166/272 |
| 4,703,797 | 11/1987 | Djabbarah ........................... 166/252 |
| 4,727,938 | 3/1988 | Lau ................................ 166/274 X |

FOREIGN PATENT DOCUMENTS 3828736  3/1989  Fed. Rep. of Germany .

OTHER PUBLICATIONS

SPE 14394, "Surfactants for $CO_2$ Foam Flooding," by J. K. Borchardt et al., 1985.

*Primary Examiner*—George A. Suchfield

[57] ABSTRACT

An improved process for recovering oil by injecting a mixture of noncondensible gas and gas foam surfactant into an oil-containing subterranean reservoir, the improvement provided by using a surfactant enriched in olefin disulfonate. The surfactant may be used in either a gas drive or a gas soak process. Disulfonate-enriched gas foam surfactants and mixtures are also described.

17 Claims, No Drawings

4,911,238

GAS FLOODING WITH SURFACTANTS ENRICHED IN OLEFIN DISULFONATE

BACKGROUND OF THE INVENTION

This invention concerns a surfactant-enhanced gas flooding process where a surfactant solution and a gas are used to form a gas foam within a subterranean reservoir that will displace and recover hydrocarbons from within the reservoir. It is particularly applicable to gas flooding operations where the surfactant employed is a disulfonate-enriched olefin sulfonate. The disulfonate-enriched olefin sulfonate surfactant compositions and foamable mixtures of those surfactants useful in gas flooding operations are also described.

A variety of techniques have been used to enhance the recovery of hydrocarbons from subterranean reservoirs in which the hydrocarbons no longer flow by natural forces. One such technique is water injection, or water flooding, to force hydrocarbons from the subterranean reservoir by flowing water through the formation. Another technique is the use of gas injection, which also functions to force hydrocarbons from the subterranean formation. Gas flooding for oil recovery is frequently used subsequent to water flooding. To enhance the effectiveness of gas flooding, a miscible gas may be used to swell and reduce the viscosity of oil present in the formation.

Due to the low viscosity of gas, it will finger or flow through the paths of least resistance, thus bypassing significant portions of the formation, and resulting in early breakthrough at the production well. Also, due to its low density, the injected gas tends to rise to the top of the formation and "override" portions of the formation. The mobility of the injected gas, combined with variations in reservoir permeability, often results in an irregular injection profile. All of these factors may result in lower hydrocarbon recovery.

The overall efficiency of a gas flooding process can be improved with the addition of a foaming agent or surfactant which is introduced directly into the reservoir by means of a water or brine vehicle prior to injection of the gas. The surfactant should have sufficient foaming ability and stability to satisfactorily reduce mobility of the gas, thereby reducing its tendency to channel through highly permeable fissures, cracks, or strata, and directing the gas toward previously unswept portions of the formation. The surfactant should also be chemically and thermally stable and soluble in the aqueous phase present under reservoir conditions. A process for improving the efficiency of a gas flooding process by injecting a surfactant to produce a gas foam in-situ is revealed in U.S. Pat. No. 2,866,507.

It is an object of this invention to provide an improved gas foam oil recovery process by which lower residual oil saturation levels are achieved. Another object of this invention is to provide an improved gas foam flooding process which achieves sweep efficiencies better than those which may be obtained through use of commercially available olefin sulfonate surfactants.

SUMMARY OF THE INVENTION

This invention relates to a gas foam flooding process where a mixture of surfactant solution and gas are used to form a gas foam within the reservoir that will displace and sweep hydrocarbons from within an oil-containing subterranean reservoir and towards recovery wells. It is applicable to both gas drive and gas soak operations. The improvement is provided by using an olefin sulfonate surfactant enriched in olefin disulfonate. Relative to conventional olefin sulfonate surfactants, disulfonate-enriched surfactants with properly selected carbon number ranges produce a lower interfacial tension in the presence of oil, provide a foam of comparable strength, propagate at least as quickly, and reduce residual oil saturation to lower levels. Surfactants enriched in olefin disulfonate include those which are specifically prepared to contain high concentrations of disulfonates, as well as formulations or mixtures of disulfonate and other olefin-derived surfactants. The disulfonate-enriched gas foam surfactants and foamable mixtures are also described herein.

DETAILED DESCRIPTION OF THE INVENTION

The present invention is, at least in part, based on a discovery that the presently described novel olefin disulfonate-enriched gas foam surfactants provide unobvious and beneficial advantages in a gas foam drive process. For example, where the gas foam mixture contains a disulfonate-enriched surfactant, a noncondensible gas and an electrolyte, in proportions near optimum for foam formation in the presence of oil, the new surfactants, relative to previously known, commercially available olefin sulfonate surfactants, provide lower interfacial tension with oil, move substantially as quickly through the reservoir, and form a gas foam of comparable strength. Also, the presently described surfactants provide significantly lower residual oil saturation, at concentrations which are comparable to those required for equal mobility control by the surfactants which have been considered to be among the best available for such purpose.

The novel olefin disulfonate gas foam surfactants and gas foam mixtures described are useful for both a gas drive and a gas soak process. Of particular interest in this respect are gas foam mixtures containing (a) a surfactant component present in the liquid phase of the mixture in an amount between about 0.01 and about 10 wt % (calculated on the weight of the liquid phase), said surfactant component comprising in substantial part olefin disulfonate, and (b) a noncondensible gas. Preferably, an electrolyte may be present in the liquid phase of the mixture in an amount between about 0.01 and about 15 wt % or more.

The present surfactant compositions are significantly different from those prepared by conventional manufacturing processes for alpha or internal olefin sulfonates because their surfactant component is substantially enriched in olefin disulfonates. Although increased disulfonate concentration for a given carbon chain length can result in a less effective steam foam surfactant, the combination of an increase in carbon chain length (such as an increase in median carbon number from 17 to 22), and an increase in disulfonate concentration, has been found to result in an improved gas foam surfactant. Because of this, the present compositions are capable of forming gas foams which reduce gas mobility significantly more, and produce residual oil saturations significantly less, than commercially available gas foam surfactants.

The surfactant component of the mixture is an olefin sulfonate, prepared or formulated to have a disulfonate content higher than what is currently typical in commercially available olefin sulfonate compositions. In the past, standard commercially available alpha olefin sulfonates have contained up to 15 wt % disulfonates. However, since the presence of disulfonates has been viewed as undesirable in these surfactants, manufacturers have consciously reduced the disulfonate concentrations in alpha olefin sulfonate products, and currently available alpha olefin sulfonates typically contain no more than 5–7 wt % disulfonates.

The olefin sulfonates suitable for use in the present invention are preferably derived from a particular class of olefins, which may be defined for present purposes in terms of the number of carbon atoms in their molecular structure. These olefins have a carbon number in the range of from about 16 to about 40, preferably in the range of from about 18 to about 36, more preferably in the range of from about 20 to about 32, and most preferably in the range of from about 20 to about 28. Either alpha, internal, or vinylidene olefins are considered suitable for use in the invention. Particularly suitable for purposes of the invention is an olefin sulfonate derived from substantially linear alpha-olefins or internal olefins. Olefin sulfonates derived from branched chain alpha-olefins or internal olefins are also suitable for purposes of the invention, provided the chain branches are no more than about two carbon atoms in length.

For preparation of olefin sulfonates, the olefins as described above are subjected to reaction with sulfur trioxide ($SO_3$). The term "sulfur trioxide" is intended to include any compounds or complexes which contain or yield $SO_3$ for a sulfonation reaction as well as $SO_3$ per se. This reaction may be conducted according to methods well known in the chemical arts, typically by contact of a flow of dilute $SO_3$ vapor with a thin film of liquid olefin at a temperature in the range of about 35° to about 75° C. The sulfonation reaction between the $SO_3$ and the olefin yields a crude product, containing alkene sulfonic acids, and an intermediate, believed to be in the nature of a sultone. The sultone is subsequently hydrolyzed by reaction with water and neutralized by reaction with base, preferably an alkali or alkaline earth metal hydroxide, oxide, or carbonate. Although the composition of the sulfonate product varies somewhat depending on a number of factors, particularly the nature of the olefin and the sulfonation reaction conditions, where sodium hydroxide is used as the base, the four principal components are usually alkene sulfonic acid sodium salts (about 50 to 70 wt %), hydroxy-alkane sulfonic acid sodium salts (20–40 wt %), and alkene and hydroxy-alkane disulfonic acid disodium salts (5–15 wt %). The two sulfonic acid sodium salts may be characterized as monosulfonates, and the two disulfonic disodium salts may be characterized as disulfonates. Conventional manufacture typically yields as the surfactant product an aqueous solution of the olefin sulfonates, for example, a 30 wt % solution in water. Such solutions, after dilution with water or brine, may be directly applied to the preparation of gas foam mixtures for purposes of this invention.

The disulfonate content of the surfactant product can be increased by increasing the ratio of dilute $SO_3$ vapor to liquid olefin in the sulfonation reaction. Typical olefin sulfonate processes employ an $SO_3$/olefin mole ratio of 0.90 to 1.15. $SO_3$/olefin ratios greater than 1.15 can be used to prepare olefin sulfonate mixtures that are suitably enriched in disulfonates. In a commercial facility, it may be desirable to recycle the unreacted dilute $SO_3$ vapor. Also, recycle of the sulfonated olefin product back through the sulfonation process will provide enriched disulfonate compositions at lower $SO_3$/olefin ratios in the reaction step. Olefin sulfonate compositions suitable for use in the present invention have a disulfonate content of from about 25 to about 100 wt %, preferably from about 30 to about 100 wt %, more preferably from about 40 to about 100 wt %, and most preferably from about 50 to about 100 wt %.

The water used in the present compositions and/or process can be any aqueous liquid that is compatible with, and does not significantly inhibit, the foam-forming properties of the gas foam mixtures of the present invention. Fresh water may be used, but where large quantities of water are to be injected, brine is preferred, particularly a brine produced from the same reservoir. Ideally, the quantity of water present should be sufficient to allow the surfactant solution to form a foam when mixed with the gas. The water can contain salts and other additives which enhance its properties, such as scale inhibitors and the like.

In general, the noncondensible gas used in a gas foam mixture of the present invention can comprise substantially any gas which (a) undergoes little or no condensation under reservoir conditions, and (b) is substantially inert to and compatible with the surfactant and other components injected along with the gas. Such a gas is preferably nitrogen, but can comprise other gases, such as air, carbon dioxide, carbon monoxide, ethane, methane, flue gas, fuel gas, or the like. The noncondensible gas may be present in the gas foam mixture at a concentration of from about 1 to about 100 mol % of the gaseous phase of the mixture.

The presence in the gas foam mixture of an electrolyte may enhance the formation of a foam capable of reducing residual oil saturation. Some or all of the electrolyte can comprise an inorganic salt, preferably an alkali metal salt, more preferably an alkali metal halide, and most preferably sodium chloride. Other inorganic salts, for example, halides, sulfates, carbonates, bicarbonates, nitrates, and phosphates, in the form of salts of alkali metals or alkaline earth metals, can be used. The presence of an added electrolyte may be unnecessary where the water injected, or the connate waters present in the reservoir, contain enough electrolyte to form an effective foam.

The gas foam mixture is formed by co-injecting noncondensible gas and surfactant solution containing a concentration of from about 0.01 wt % to about 10 wt % active surfactant into an injection well. Preferably, the surfactant solution contains a concentration of from about 0.05 wt % to about 5 wt % active surfactant, and more preferably, the surfactant solution contains a concentration of from about 0.05 wt % to about 2 wt % active surfactant. Most preferably, the surfactant is injected in as small an amount as possible to adequately enhance oil recovery. As an alternative, the gas foam mixture may be formed by sequentially injecting surfactant solution followed by noncondensible gas. An aqueous electrolyte solution may be incorporated into the gas foam mixture, preferably by combining the electrolyte solution with the surfactant solution.

Any standard method of creating a gas foam is suitable for use in the invention. Sufficient water or brine must be included in the gas foam mixture and/or present in the formation to produce an effective gas foam within the reservoir. Under some circumstances, a sand-filled line may be used to initiate foam. The gas foam mixture is injected into the reservoir at a rate determined by reservoir characteristics and well pattern area. The injection and production wells can be arranged in any pattern. Preferably, the injection well is surrounded by production wells, however, the invention is also applicable to a gas soak (single well) process.

Following injection of the gas foam mixture, a combination of aqueous and/or gaseous drive fluids are injected. The aqueous drive fluid may be water or brine or the like. The gaseous drive fluid may be any noncondensible gas. In one possible mode of the present process, injection of the gas foam mixture is followed by displacement with additional gas. Alternatively, injection of the gas foam mixture may be followed by injection of additional water or brine, and subsequently followed by injection of additional noncondensible gas. Alternating slugs of gas and water or brine may also be used for displacement.

In a gas foam drive process, the injection and initial displacement of the gas foam mixture within the reservoir creates a foam which is driven through the formation and towards a production well. Oil and other produced fluids are recovered from production wells until the gas/oil recovery ratio becomes uneconomically high. The amount of displacement fluid injected relative to the amount of gas foam mixture injected is determined by reservoir size, well spacing, and various reservoir properties.

In a gas foam soak process, injection and production occur at a single well. Injection of the gas foam mixture is followed by a soak phase, in which the well is shut in to allow the gas present in the foam to contact and swell the oil and/or reduce its viscosity. Preferably, the gas used is at least partially miscible with the oil present in the reservoir under reservoir conditions. After the soak period, the well is placed in production to recover oil and other fluids from the reservoir. Optionally, initial injection of the gas foam mixture may be followed by injection of a drive fluid to displace the gas foam mixture some additional distance from the well before the soak phase occurs.

Having discussed the invention with reference to certain of its preferred embodiments, it is pointed out that the embodiments discussed are illustrative rather than limiting in nature, and that many variations and modifications are possible within the scope of the invention. Many such variations and modifications may be considered obvious and desirable to those skilled in the art based upon a review of the foregoing description of preferred embodiments and the following experimental results.

EXPERIMENTAL RESULTS

Experiments were conducted to measure (1) interfacial tension (IFT) of surfactant mixtures against oil, (2) relative foam strength, (3) surfactant propagation, or transport rate, and (4) residual oil saturation (ROS) after low rate nitrogen flooding, all with surfactant mixtures containing various combinations of monosulfonated and disulfonated olefins.

Surfactant Sample Preparation

The surfactants evaluated are listed in Table 1. Three methods were used to prepare disulfonate-enriched surfactants for laboratory evaluation; (1) high $SO_3$/olefin ratio, (2) filtration/separation, and (3) blending.

Some disulfonate-enriched surfactants were formed by increasing the $SO_3$/olefin ratio in the sulfonation reaction step. Sulfonation reactions have been performed at $SO_3$/olefin ratios as high as 7.0, and products containing as much as about 84 wt % disulfonate resulted. However, limited data suggest that an increase in $SO_3$/olefin ratio above about 1.8 may not provide substantial further improvement in surfactant characteristics, apparently due to the presence of small amounts of byproducts formed at higher $SO_3$/olefin ratios. Commercial scale production of surfactants may require somewhat different $SO_3$/olefin ratios to produce surfactants with a given wt % disulfonate.

The isolation of high purity alpha olefin disulfonates from alpha olefin sulfonates (AOS) can be accomplished by physically separating (by filtration) the liquid and semi-solid emulsion phases of the AOS product, where the median carbon number range is greater than 20. A sample of AOS 2024, with a nominal carbon number range of 20 to 24 and which overall contained 17 wt % disulfonate, was found to contain 98 wt % disulfonate in the liquid phase, but only about 2 wt % disulfonate in the semi-solid emulsion phase of the surfactant. Internal olefin sulfonate surfactants, and alpha olefin sulfonates with carbon numbers less than 20, were found to have no such distinction between the liquid and semi-solid emulsion phases. Another disulfonate enriched surfactant was formed by blending the 98 wt % disulfonate surfactant with the original AOS 2024 to give a surfactant with 65 wt % disulfonate.

The base case surfactant used for comparison in all experiments was ENORDET ® AOS 1618, a commercially manufactured AOS available from Shell Chemical Company, with a nominal carbon number range of 16 to 18. A few experiments were also conducted with CHASER ® SD1000, a commercially manufactured AOS dimer available from Chevron Chemical Company, with a nominal carbon number range of 22 to 32. The CHASER ® product is derived from alpha olefins in a reaction sequence that is different from that used to produce AOS. The AOS dimers are produced by sulfonating alpha olefins using typical olefin sulfonation conditions, heating the sulfonated product to cause dimerization in a separate reaction step, and then neutralizing the dimerized product. This process is described in U.S. Pat. No. 3,721,707.

TABLE 1

| Surfactant | SURFACTANT COMPOSITION | | | |
| --- | --- | --- | --- | --- |
| | Sulfonation $SO_3$/Olefin Mole Ratio | Additional Preparation Steps | Average Molecular Weight | Approximate Wt % Monosulfonate/ Disulfonate |
| ENORDET ® AOS 1618 | 1.15 | None | 356 | 89/11 |
| AOS 2024S | 1.15 | Filtration | 427 | 98/2 |
| AOS 2024T | 1.15 | None | 407 | 95/5 |
| AOS 2024R | 1.15 | None | 413 | 93/7 |
| AOS 2024 | 1.15 | None | 441 | 83/17 |
| AOS 2024E | 1.8 | None | 469 | 58/42 |
| AOS 2024C | 1.15 | Filtration | 455 | 58/42 |
| AOS 1618E | 2.3 | None | 402 | 39/61 |

TABLE 1-continued

| | SURFACTANT COMPOSITION | | | |
|---|---|---|---|---|
| Surfactant | Sulfonation SO$_3$/Olefin Mole Ratio | Additional Preparation Steps | Average Molecular Weight | Approximate Wt % Monosulfonate/ Disulfonate |
| AOS 2024B | 1.15 | Filtration and Blending | 476 | 35/65 |
| AODS 2024 | 1.15 | Filtration | 526 | 2/98 |
| CHASER ® SD1000 | —[1] | Dimerization | 616 | 48/52[2] |

[1] U. S. Pat. No. 3,721,707 specifies a ratio of 1.2.
[2] Ratio of monomer AOS to dimer AOS.

Experimental Procedures

The IFT experiments were conducted with the use of a University of Texas Model 500 Spinning Drop Interfacial Tensiometer. The tests were conducted at 75° C., using 0.5 wt % surfactant solutions, with and without 3 or 4 wt % NaCl. The oil phase was either decane (a refined oil), Patricia Lease crude from the Kern River field, Kernridge crude from the South Belridge field, or crude from the Midway Sunset field (all heavy California crude oils). It has been found that stable readings for crude oils may be obtained over a shorter time period if the aqueous phase (containing surfactant, with or without salt) and oil phase are equilibrated under the test conditions prior to determination of the IFT. Consequently, when crude oils were used as the oil phase, the oil and surfactant solutions were first equilibrated overnight. For decane, the tensiometer tube was first filled with the surfactant mixture, and then 3 microliters of oil were added. For crude oils, first the tensiometer tube was rinsed with the surfactant mixture (to prevent the viscous oil from sticking to the tube), next 0.005 grams of oil was weighed into the tube, and then the tube was filled with the surfactant mixture. Once the oil droplets were stabilized in the tensiometer, measurements were made to allow calculation of the IFT.

One atmosphere foaming experiments were used as an indication of relative foam strength. The tests were conducted at a temperature of 75° C., using 0.25 wt % surfactant solutions in deionized water. The surfactant solution (10 cc) was placed in a 25 cc graduated cylinder, and then the hydrocarbon phase (3 cc) was added. Hydrocarbons used included decane, and a 3:1 volume blend of decane and toluene. The headspace of the cylinder was flushed with nitrogen, the cylinder was then sealed and shaken, and then the samples were equilibrated at the test temperature for 24 hours. After temperature equilibrium, samples were carefully shaken for one minute. Foam volume (cc) was then determined as a function of elapsed time from the end of foam generation.

Foam propagation and ROS experiments were conducted by flowing a gas foam mixture through an oil-containing sand pack. A typical sand pack test apparatus consists of a cylindrical tube, about 1.0 inch in diameter by 12 inches long. Such a sand pack may be oriented either horizontally or vertically. The sand pack is provided with at least two pressure taps, which are positioned so as to divide the pack approximately into thirds. At the inlet end, the sand pack is preferably arranged to receive separate streams of noncondensible gas and one or more aqueous liquid solutions containing a surfactant to be tested and/or a dissolved electrolyte. Some or all of those components are injected at constant mass flow rates, proportioned so that the mixture will be homogeneous substantially as soon as it enters the face of the sand pack. The permeability of the sand pack and foam debilitating properties of the oil in the sand pack should be at least substantially equivalent to those of the reservoir to be treated. By means of such tests, determinations can be made of the proportions of surfactant, noncondensible gas, and electrolyte components which are needed in order to provide the desired treatment.

For the experiments described below, the sand packs were prepared by flooding them with Kernridge oil, a heavy California crude, at a temperature of about 300° F., to provide oil saturations in the order of 80 to 90% of the pack pore volume. Waterfloods were conducted to reduce the oil saturations to residuals of about 30%. For the surfactant propagation experiments, the sand packs were flooded with synthetic connate water. For the ROS experiments, distilled water was used for the waterflood. The surfactant propagation experiments were conducted with sand packs containing Kernridge sands at 280° F. and a backpressure of 100 psig (the corresponding steam saturation temperature at this pressure is 338° F.). Surfactant was injected continuously into the pack at 1.6 ft/day, without co-injection of gas. The ROS experiments were conducted in sand packs containing Ottawa sands, at a temperature of 280° F. with a backpressure of 70 psig, and at a temperature of 300° F. and a backpressure of 110 psig.

Interfacial Tension (IFT)

Surfactants which provide low IFT, and hence greater oil recovery, are desirable. Results from the IFT experiments, compared with a base case of ENORDET ® AOS 1618, are shown in Table 2 and may be summarized as follows. The IFT values for ENORDET ® AOS 1618 decreased with the addition of NaCl, in place of fresh water, and are lower for Patricia crude from the Kern River field than for decane. The IFT of AOS 2024 (about 17 wt % disulfonate), under similar conditions, was lower. This reflects the fact that as carbon number increases, IFT will decrease. IFT of AODS 2024 (about 98 wt % disulfonate) was also lower than the values for ENORDET ® AOS 1618, but slightly higher than the values for AOS 2024. This shows that at constant carbon number, the IFT increases with increased disulfonate. It is concluded from these results that an increase in carbon number can more than offset the IFT reduction caused by significantly increasing the disulfonate content of the surfactant.

TABLE 2
INTERFACIAL TENSION (IFT) STUDIES[1]

| Surfactant | Approximate wt % Monosulfonate/ Disulfonate | Aqueous Phase | Oil Phase | IFT dynes/cm |
|---|---|---|---|---|
| ENORDET ® AOS 1618 | 89/11 | fresh water | decane | 4.7 |
| ENORDET ® AOS 1618 | 89/11 | 3% NaCl | decane | 1.9 |
| ENORDET ® AOS 1618 | 89/11 | 3% NaCl | Kern River[2] | 0.6 |
| AOS 2024S | 98/2 | fresh water | decane | 3.3 |
| AOS 2024T | 95/5 | 4% NaCl | Kern River[2] | 0.10 |
| AOS 2024T | 95/5 | 4% NaCl | So. Belridge[3] | 0.08 |
| AOS 2024T | 95/5 | 4% NaCl | Midway Sunset | 0.06 |
| AOS 2024 | 83/17 | fresh water | decane | 3.2 |
| AOS 2024 | 83/17 | 3% NaCl | decane | 0.59 |
| AOS 2024E | 58/42 | 3% NaCl | Kern River[2] | 0.3 |
| AOS 2024E | 58/42 | 4% NaCl | Kern River[2] | 0.55 |
| AODS 2024 | 2/98 | fresh water | decane | 3.8 |
| AODS 2024 | 2/98 | 3% NaCl | decane | 1.3 |
| AODS 2024 | 2/98 | 3% NaCl | Kern River[2] | 0.17 |
| CHASER ® SD 1000 | 48/52[4] | fresh water | decane | 6.8 |
| CHASER ® SD 1000 | 48/52[4] | 3% NaCl | decane | 4.0 |
| CHASER ® SD 1000 | 48/52[4] | fresh water | Kern River[2] | 1.9 |
| CHASER ® SD 1000 | 48/52[4] | 3% NaCl | Kern River[2] | 0.77 |

[1]All tests were conducted at 75° C., 167° F.
[2]Patricia Lease crude.
[3]Kernridge crude.
[4]Ratio of monomer AOS to dimer AOS.

Relative Foam Strength

Surfactants which provide a strong foam are effective at reducing gas mobility, and may also produce a lower ROS in the reservoir. Foam height values, obtained from simple shaking experiments, can be used as an indication of foam strength. Results from the foam height experiments, compared with a base case of ENORDET ® AOS 1618, are shown in Table 3. These experiments were conducted at a representative reservoir temperature of 75° C.

The results shown in Table 3 may be summarized as follows. In the presence of no oil, the foam strength of the disulfonate-enriched surfactants is clearly better than that of ENORDET ® AOS 1618. In particular, AOS 2024E (42 wt % disulfonate) still has a foam volume of 15.2 cc after 10 minutes, compared with an ENORDET ® AOS 1618 foam volume of 5 cc. In the presence of a highly aliphatic oil phase (decane), the AOS 2024E (42 wt % disulfonate) has both a higher initial foam volume (18 cc), and a higher volume at 10 minutes (9 cc), than the ENORDET ® AOS 1618 (16.8 cc and 6.8 cc).

In the presence of an aromatic oil phase, the initial value (17.4 cc) for AOS 2024E (42 wt % disulfonate) is comparable to that for ENORDET ® AOS 1618 (17.6 cc). However, subsequent values indicate that the ENORDET ® AOS 1618 may have a stronger foam in the presence of aromatic oils than the AOS 2024E (42 wt % disulfonate). These results demonstrate that the type of oil present in the reservoir must be considered when selecting an appropriate gas foam surfactant.

It may be concluded that, in reservoir sections with low residual oil levels, where gas foam must have its greatest strength, the AOS 2024E (42 wt % disulfonate) should form a stronger foam than ENORDET ® AOS 1618.

TABLE 3
RELATIVE FOAM STRENGTH STUDIES

| Surfactant | Approximate wt % Monosulfonate/ Disulfonate | Oil Phase | Foam Volume after X minutes, X = | | | |
|---|---|---|---|---|---|---|
| | | | 1.0 | 5.0 | 10.0 | 30.0 |
| ENORDET ® AOS 1618 | 89/11 | None | 18.4 | 16.0 | 5.0 | 0.0 |
| AOS 2024R | 93/7 | None | 17.4 | 16.2 | 13.2 | 3.2 |
| AOS 2024 | 83/17 | None | 16.4 | 15.2 | 12.2 | 2.0 |
| AOS 2024E | 58/42 | None | 18.4 | 17.2 | 15.2 | 2.0 |
| ENORDET ® AOS 1618 | 89/11 | Decane | 16.8 | 14.8 | 6.8 | 1.4 |
| AOS 2024R | 93/7 | Decane | 15.4 | 14.6 | 12.2 | 4.8 |
| AOS 2024 | 83/17 | Decane | 16.2 | 9.2 | 1.6 | 0.4 |
| AOS 2024E | 58/42 | Decane | 18.0 | 14.0 | 9.0 | 1.2 |
| ENORDET ® AOS 1618 | 89/11 | Decane/Toluene[1] | 17.6 | 16.8 | 15.8 | 3.4 |
| AOS 2024R | 93/7 | Decane/Toluene[1] | 15.6 | 14.8 | 12.6 | 4.8 |
| AOS 2024 | 83/17 | Decane/Toluene[1] | 9.8 | 9.6 | 6.4 | 1.8 |
| AOS 2024E | 58/42 | Decane/Toluene[1] | 17.4 | 13.8 | 8.4 | 0.8 |

[1]Mixture of 3 volumes decane to 1 volume toluene.

Surfactant Propagation

Surfactants which exhibit a fast rate of propagation, or transport, through the reservoir can be effective at sustaining the gas foam in a gas foam drive operation. Results from the surfactant propagation rate experiments, compared with a base case of ENORDET ® AOS 1618, are shown in Table 4. The sand pack effluent was analyzed for surfactant, calcium, and chloride. Surfactant retention was calculated from an integration of the surfactant and chloride breakthrough curves. These experimentally determined surfactant retentions, in pore volumes (PV), were used in the calculations to determine surfactant propagation rates. The normalized surfactant propagation rate is equivalent to ($S_w$+0.80)/($S_w$+Surfactant Retention), where $S_w$ is assumed to be 0.30 for the Kern River field, and surfactant retention using ENORDET® AOS 1618 is equal to 0.8 PV, based on experiments with Kern River sands. It may be assumed that foam propagation rate is comparable to the surfactant propagation rate.

The results given in Table 4 can be summarized as follows. At about 0.5 wt % surfactant concentration and 4 wt % sodium chloride, the AOS 2024E (42 wt % disulfonate) propagated more rapidly than the ENORDET® AOS 1618 (11 wt % disulfonate), despite the higher carbon number range of AOS 2024E. By interpolation, the AOS 2024E, at a concentration of about 0.44 wt % with 4 percent sodium chloride, would propagate as fast as a 0.5 wt % ENORDET® AOS 1618 composition. It can be concluded that the disulfonate-enriched surfactants with increased carbon number can propagate through the reservoir substantially as quickly as the base case ENORDET® AOS 1618.

end of the experiment, after opening the sand pack and extracting the oil from the sands, it was found that foam had propagated five inches into the 12-inch long sand pack, and that a two-inch oil bank was ahead of the foam. Oil saturation was 0% in the foam-swept region, 22% in the oil bank, and 15% ahead of the oil bank. The average residual oil saturation was reduced from 26% to 11% within the sand pack.

Additional experiments were conducted at 300° F. with a backpressure of 110 psig and a superficial gas velocity of 12 ft/day to simulate conditions far away from the wellbore. The Ottawa sand packs were again saturated with Kernridge crude, then waterflooded to an ROS of 26%. No sand-filled line was used.

The results of these experiments, shown in Table 5, may be summarized as follows. At a concentration of about 0.5 wt % surfactant, the AOS 2024E (about 42 wt % disulfonate) achieved a ROS of 4.5%, significantly lower than the 13.5% achieved with the ENORDET®

TABLE 4
SURFACTANT PROPAGATION EXPERIMENTS WITH KERNRIDGE SAND PACKS[1]

| Surfactant | Approximate wt % Monosulfonate/ Disulfonate | Wt % Surfactant | Wt % NaCl | Normalized Surfactant Rates[2] |
|---|---|---|---|---|
| ENORDET® AOS 1618 | 89/11 | 0.50 | 4 | 1.63 |
| AOS 2024 | 83/17 | 0.50 | 2 | 0.69 |
| AOS 2024E | 58/42 | 0.35 | 4 | 1.11 |
| AOS 2024E | 58/42 | 0.50 | 4 | 1.92 |
| AOS 1618E | 39/61 | 0.50 | 4 | 1.54 |
| AOS 2024B | 35/65 | 0.20 | 4 | 0.83 |
| AOS 2024B | 35/65 | 0.50 | 4 | 1.32 |

[1]Porosity = 0.36, temperature = 280° F., backpressure = 100 psig.
[2]Normalized Surfactant Rate = ($S_w$ + 0.80)/($S_w$ + Surfactant Retention), where $S_w$ = 0.30 and base case surfactant retention is 0.80 PV, based on experiments with Kern River sand packs.

ROS After Low Rate Nitrogen Flooding

Low rate nitrogen foam experiments were performed to determine whether foam formed at high flow rates near the wellbore could propagate at much lower flow rates far away from the injection point, and to determine ROS values after gas flooding. The first experiment was conducted at 280° F. with a backpressure of 70 psig. An Ottawa sand pack was initially saturated with Kernridge crude and then waterflooded to an ROS of 26 percent. Two pore volumes of 0.5 wt % of AOS 2024E (42 wt % disulfonate) with 4 wt % NaCl were injected. Nitrogen and additional surfactant formulation were injected through an oil-free sand-filled line (used to enhance foam generation) and then into the sand pack. For most of the experiment, gas and liquid superficial velocities were 21 and 0.66 ft/day, respectively, in the sand pack and 144 times larger in the sand filled line. Gas fractional flow was near 0.97.

Results of this experiment can be summarized as follows. Foam generated at high rates in sand filled lines propagated at much lower rates in the sand pack. This was evidenced by the rise in pressure gradient with time. Even at these low flow rates, foam produced a very high pressure gradient inside the sand pack. At the AOS 1618 at 0.5 wt %. Increasing the AOS 2024E concentration to 1.27 wt % provided no further ROS reduction. This indicates that the disulfonate-enriched surfactants can achieve lower ROS values than typical alpha olefin sulfonate surfactants.

TABLE 5
ROS IN LOW RATE NITROGEN FOAM EXPERIMENTS

| Surfactant | Approximate wt % Monosulfonate/ Disulfonate | Wt % Surfactant | Wt % NaCl | ROS % PV |
|---|---|---|---|---|
| ENORDET® AOS 1618 | 89/11 | 0.50 | 4 | 13.5 |
| AOS 2024E | 58/42 | 0.51 | 4 | 4.5 |
| AOS 2024E | 58/42 | 1.27 | 4 | 4.5 |

What is claimed is:

1. A process for recovering oil from a reservoir penetrated by at least one injection well and at least one production well, comprising:
displacing within the reservoir a gas foam mixture of noncondensible gas and aqueous surfactant solution, said surfactant containing at least about 25 wt % olefin disulfonate, said olefin disulfonate derived from olefins with carbon numbers in the range of from about 16 to about 40.

2. A process for recovering oil from a reservoir penetrated by at least one injection well and at least one production well, comprising:
injecting into the reservoir a gas foam mixture of noncondensible gas and aqueous surfactant solution, said surfactant containing at least about 25 wt % olefin disulfonate, said olefin disulfonate derived from olefins with carbon numbers in the range of from about 16 to about 40; and displacing the gas foam mixture within the reservoir to assist in recovery of hydrocarbons at the production well.

3. The process of claim 2 wherein the surfactant contains at least about 30 wt % olefin disulfonate.

4. The process of claim 2 wherein the surfactant contains at least about 40 wt % olefin disulfonate.

5. The process of claim 4 wherein the surfactant contains at least about 50 wt % olefin disulfonate.

6. The process of any one of claims 2, 3, 4, or 5 wherein an electrolyte is injected in a concentration from about 0.01 wt % to about 15.0 wt % of the aqueous phase of the gas foam mixture.

7. A process for recovering oil from a reservoir through the use of a single well, comprising:
    injecting into the reservoir a gas foam mixture of noncondensible gas and aqueous surfactant solution, said surfactant containing at least about 25 wt % olefin disulfonate, said olefin disulfonate derived from olefins with carbon numbers in the range of from about 16 to about 40;
    allowing the gas foam mixture to soak in the reservoir; and
    producing oil from the reservoir.

8. The process of claim 7 wherein the surfactant contains at least about 30 wt % olefin disulfonate.

9. The process of claim 7 wherein the surfactant contains at least about 40 wt % olefin disulfonate.

10. The process of claim 7 wherein the surfactant contains at least about 50 wt % olefin disulfonate.

11. The process of any one of claims 7, 8, 9, or 10 wherein an electrolyte is injected in a concentration from about 0.01 wt % to about 15.0 wt % of the aqueous phase of the gas foam mixture.

12. A process for recovering oil from a reservoir penetrated by at least one injection well and at least one production well, comprising:
    injecting into the reservoir an aqueous surfactant solution wherein the surfactant contains at least about 25 wt % olefin disulfonate, said olefin disulfonate derived from olefins with carbon numbers in the range of from about 16 to about 40;
    injecting into the reservoir a noncondensible gas;
    forming a gas foam mixture; and
    displacing the gas foam mixture within the reservoir by injecting additional noncondensible gas to assist in recovery of hydrocarbons at the production well.

13. The process of claim 12 wherein the surfactant contains at least about 30 wt % olefin disulfonate.

14. The process of claim 12 wherein the surfactant contains at least about 40 wt % olefin disulfonate.

15. The process of claim 12 wherein the surfactant contains at least about 50 wt % olefin disulfonate.

16. The process of any one of claims 12, 13, 14, or 15 wherein an electrolyte is injected in a concentration from about 0.01 wt % to about 15.0 wt % of the aqueous phase of the gas foam mixture.

17. A process for recovering oil from a reservoir penetrated by at least one injection well and at least one production well, comprising:
    injecting into the reservoir a gas foam mixture, comprising:
    (a) aqueous surfactant solution, wherein the surfactant is present in a concentration of from about 0.05 wt % to about 5.0 wt % in the aqueous phase of the gas foam mixture, and wherein the surfactant contains at least about 40 wt % olefin disulfonate, said olefin disulfonate derived from olefins with carbon numbers in the range of from about 16 to about 40;
    (b) noncondensible gas, in an amount of from about 1 mol % to about 100 mol % of the gaseous phase of the gas foam mixture; and
    (c) electrolyte, in a concentration of from about 0.01 wt % to about 15.0 wt % of the aqueous phase of the gas foam mixture; and
    displacing the gas foam mixture within the reservoir to assist in recovery of oil at the production well.

* * * * *